V. L. SULLIVAN.
ELECTRIC GENERATOR ATTACHMENT FOR WINDMILLS.
APPLICATION FILED FEB. 12, 1919.
1,336,544. Patented Apr. 13, 1920
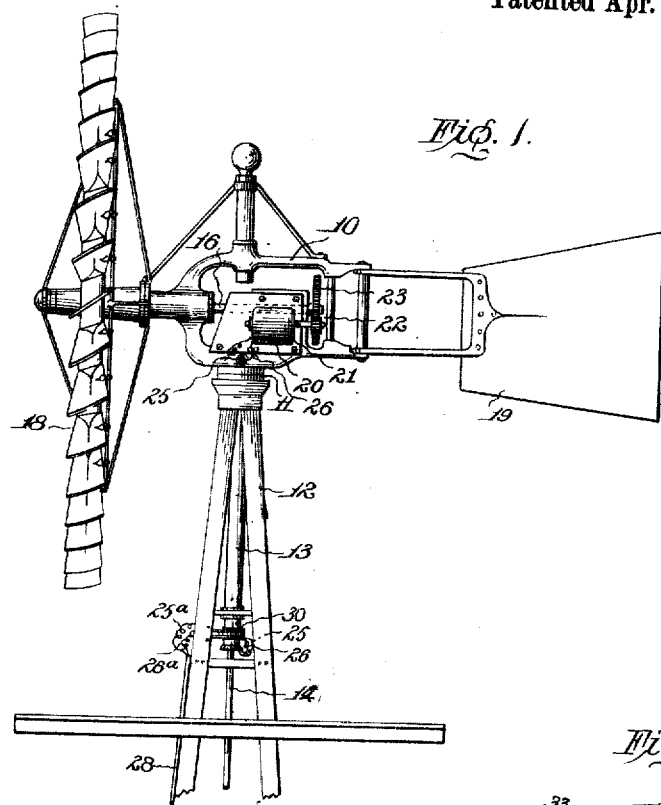
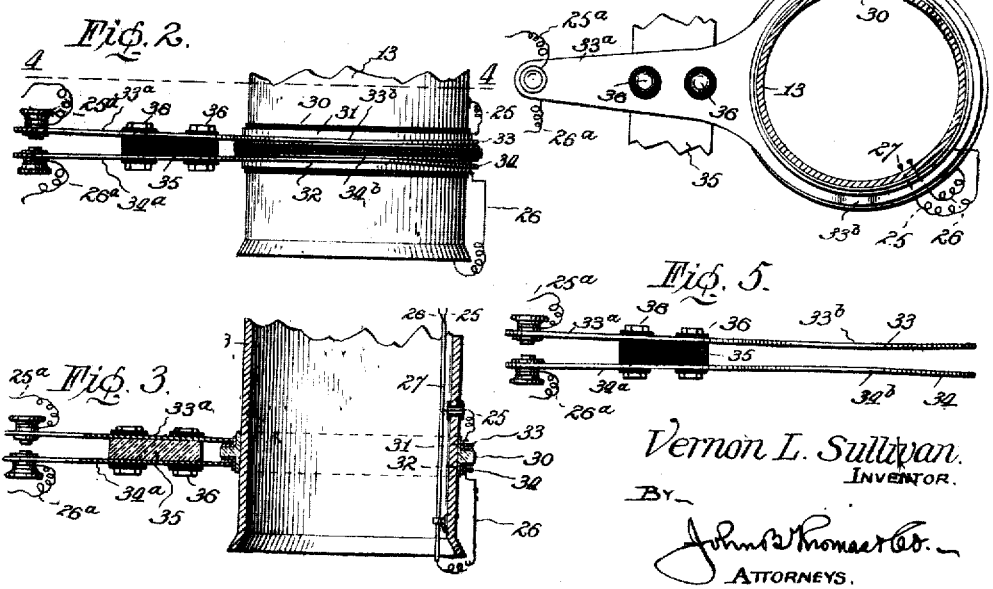
Vernon L. Sullivan,
INVENTOR.
ATTORNEYS.

UNITED STATES PATENT OFFICE.

VERNON L. SULLIVAN, OF EL PASO, TEXAS.

ELECTRIC-GENERATOR ATTACHMENT FOR WINDMILLS.

1,336,544.  Specification of Letters Patent.  Patented Apr. 13, 1920.

Application filed February 12, 1919. Serial No. 276,562.

*To all whom it may concern:*

Be it known that I, VERNON L. SULLIVAN, a citizen of the United States, residing at El Paso, in the county of El Paso and State of Texas, have invented an Electric-Generator Attachment for Windmills, of which the following is a full and complete specification.

The primary object of my invention is to utilize the power of a windmill for operating an electric-generator to furnish an electric-current which may be used for various purposes, such as driving electric motors for operating all kinds of machinery, electric lighting, heating, &c.

Therefore it is for the purpose of utilizing the full power of the windmill that I propose to locate an electric-generator at a convenient point on the rotatable head of the windmill so that it may be operated directly from the shaft of the windmill and produce an electric current that will enable such windmill to do more work than heretofore; conveying the current from the generator to the point or points of consumption by means of wire conductors combined with a device of particular construction for making connection between the wires carried by and rotatable with the windmill-head and mast-pipe and the stationary wires extending down the tower; whereby the electric-current may be employed for performing the function of the windmill in some instances and for various other domestic purposes, as running small electric-motors, electric lighting, &c., the full capacity of the electric generating plant being maintained by interposing storage batteries in the circuit to store electric energy during the time the supply is not being drawn upon.

With these principal objects in view my invention consists in certain means for conducting the current to the point or points for utilizing the same; as hereinafter fully described and specifically set forth in the claim.

In the accompanying drawings:

Figure 1 is an elevation showing the application of my invention.

Fig. 2 is an enlarged detail view of the lower end of the mast-pipe, showing the devices for conducting the electric-current from the wires carried by the rotatable portion of the windmill to the wires extending down the tower.

Fig. 3 is a vertical sectional view of Fig. 2.

Fig. 4 is a transverse sectional view on the line 4—4 of Fig. 2, and

Fig. 5 is a detail side view of the fixed member of the conductor device.

My invention is adapted to be applied to any conventional type of windmill, that shown in Fig. 1 for illustration having a head 10 rotatable on a turn-table 11 at the upper end of the tower 12, with a depending mast-pipe 13 through which the pump-rod 14 passes, the latter being operated in any suitable manner by the horizontal shaft 16 to which the wind-wheel 18 is fixed and the aforesaid rotatable head carrying the wind-wheel and depending mast-pipe being provided with the usual tail-vane 19.

In carrying out my invention I employ any approved form of electric-generator 20, mounting the same on a base-board 21 by which it is firmly bolted or otherwise fastened to the rotatable head 10 of the windmill, and connect said generator to the wind-wheel shaft 16 by means of intermeshing gearwheels 22 and 23 on the generator-shaft and wind-wheel shaft, respectively, though of course any other form of gearing may be employed, if desired. By this arrangement the electric generator is operated directly from the wind-wheel shaft and will conserve the surplus power over that required in operating the pump, and may receive all the power of said wind-wheel when the tank is filled by simply disconnecting the pump-rod from the pump.

Conducting wires 25 and 26 from the generator pass through the rotatable head 10 into the mast-pipe 13 and out at the lower end of the latter, and as these wires rotate with the head and mast-pipe, in accommodating the wind-wheel to the direction of the wind, it is necessary to provide a movable contact or conductor device for connecting these wires to service wires 25ª and 26ª which extend down the tower to the point or points of consumption of the current in completing the circuit. This conductor device comprises a flanged ring or band 30 of insulating material fastened to the mast-pipe and carrying angle-plates 31 and 32 attached thereto and insulated from each other, said angle-plates forming the rotatable portion of the conductor device by moving with the mast-pipe and are connected to the wires 25 and 26 as shown in the drawings. In slidable contact with these plates are companion annular plates or rings 33 and 34 having arms 33ª and 34ª, respectively, by which they are immovably supported in the tower and connected to the service wires by the usual screws and nuts, said rings being clamped against the horizontal flanges of the angle-plates 32 and 33, to insure required contact, by attachment to a supporting block 35 of insulating material, and are preferably bent up at opposite sides on a line with the arms to provide contact-points 33ᵇ, 34ᵇ. The bolts 36, connecting the stationary contact-members of the conductor device to the supporting block, are suitably insulated from said contact-members.

The practical application of my invention will be readily understood, for in operation the power of the windmill, either wholly or partially as hereinbefore explained, is directed to the operation of the electric-generator, and the current is conducted by wire 25 to the plate 31 rotatable with the mast-pipe, from this plate to the stationary plate 33, to wire 25ª and on to the point of consumption; the return of the circuit being by way of wire 26ª, contact plates 34 and 32, and wire 26 back to the generator. The current or electric energy may be used for various purposes, as will be understood, and in order to increase the efficiency of the electric plant ordinary storage-batteries may be included in the circuit.

I claim as my invention:

A device for conveying current between two relatively rotatable members comprising a band of insulating material attached to one of said members and having an outwardly projecting flange with angular conductor plates attached to said band above and below the flange, and companion annular conductor plates bearing against the angular plates, respectively, and having arms by which they are supported on the other member, said annular plates being bent outwardly to provide contact points which slide over the angular plates, and electric connections extending to and from the two sets of conductor plates, respectively, substantially as herein shown and described.

VERNON L. SULLIVAN.